United States Patent [19]

Ikeda et al.

[11] Patent Number: 4,682,167

[45] Date of Patent: Jul. 21, 1987

[54] DATA TRANSFER SYSTEM FOR NUMERICALLY CONTROLLED EQUIPMENT

[75] Inventors: Yoshiaki Ikeda, Hachioji; Mitsuru Kuwasawa, Kunitachi, both of Japan

[73] Assignee: Fanuc Ltd, Minamitsuru, Japan

[21] Appl. No.: 822,422

[22] PCT Filed: May 15, 1985

[86] PCT No.: PCT/JP85/00267

§ 371 Date: Jan. 16, 1986

§ 102(e) Date: Jan. 16, 1986

[87] PCT Pub. No.: WO85/05471

PCT Pub. Date: Dec. 5, 1985

[30] Foreign Application Priority Data

May 16, 1984 [JP] Japan .................................. 59-98093

[51] Int. Cl.[4] ...................... H04Q 9/00; G06F 13/00; H04L 13/00

[52] U.S. Cl. .......................... 340/825.23; 340/825.52; 340/825.62

[58] Field of Search ...................... 340/825.23, 825.52, 340/825, 825.62; 375/106, 109; 370/91, 100, 112, 113

[56] References Cited

U.S. PATENT DOCUMENTS 4,366,478 12/1982 Masuda et al. ...................... 340/825

FOREIGN PATENT DOCUMENTS 50-68622 6/1975 Japan .
50-98246 8/1975 Japan .
56-15527 11/1981 Japan .
57-71004 5/1982 Japan .
57-76604 5/1982 Japan .

Primary Examiner—Donald J. Yusko
Attorney, Agent, or Firm—Staas & Halsey

[57] ABSTRACT

A data transfer system transfers, bit by bit, serial data sent from first equipment (10) to predetermined bits of a predetermined address in a RAM (300) of second equipment (30). Each bit of the serial data sent from the first equipment (10) is transferred to a predetermined bit of a predetermined address of the RAM (300) in the second equipment (20) upon each occurrence of a clock pulse which is delivered from the first equipment (10) in synchronism with each bit data. The data transfer system includes a counter (206) which is incremented by the clock pulses and an address generator (210) which responds to the output of the counter (206) to generate an address of the RAM (300). A bit address generator (211) responds to the output of the counter (206) to generate a bit address for specifying a bit position in one address of the RAM (300), and a timing control circuit (209) responds to the output of the counter (206) to generate timing signals for a read cycle and a write cycle succeeding it during the period of generation of one address by the address generator (210). A read modify write circuit (214) substitutes bit data from the first equipment 10 for data at that bit position of a plurality of bits in parallel data corresponding to the address from the address generator (210), read out of the RAM (300) in the read cycle specified by the timing control circuit (209), which is specified by the bit address from the bit address generator (211). The substituted parallel data is transferred to the original address in the RAM (300) during the write cycle specified by the timing control circuit (209). Thus, each bit of the serial data sent from the first equipment (10) can be transferred to a predetermined bit of a predetermined address in the RAM (300) of the second equipment (30).

3 Claims, 6 Drawing Figures

FIG. 3

| TRANSMISSION INFORMATION/ RECEPTION INFORMATION | LOADING ADDRESS/BIT IN RAM 300 | ADDRESS FROM ADDRESS GENERATOR 210 | BIT ADDRESS FROM BIT ADDRESS GENERATOR 211 | MODE SPECIFIED BY TIMING CONTROL CIRCUIT 209 |
|---|---|---|---|---|
| S1~S8 | 0 ADDRESS $a_0$~$a_7$ BIT | 0 | $a_0$~$a_7$ | READ, WRITE |
| S9~S16 | 1 ADDRESS $a_0$~$a_7$ BIT | 1 | , | , |
| ... | ... | ... | ... | ... |
| S89~S96 | 11 ADDRESS $a_0$~$a_7$ BIT | 11 | $a_0$~$a_7$ | READ, WRITE |
| S97~S100 | 12 ADDRESS $a_0$~$a_3$ BIT | 12 | $a_0$~$a_3$ | , |
| r1~r8 | 20 ADDRESS $a_0$~$a_7$ BIT | 20 | $a_0$~$a_7$ | READ |
| r9~r16 | 21 ADDRESS $a_0$~$a_3$ BIT | 21 | * | * |
| ... | ... | ... | ... | ... |
| r89~r96 | 31 ADDRESS $a_0$~$a_7$ BIT | 31 | $a_0$~$a_7$ | READ |
| r97~r100 | 32 ADDRESS $a_0$~$a_3$ BIT | 32 | $a_0$~$a_3$ | * |

DATA TRANSFER SYSTEM FOR NUMERICALLY CONTROLLED EQUIPMENT

BACKGROUND OF THE INVENTION

The present invention relates to a data transfer system which transfers, bit by bit, serial data sent from first equipment, such as a numerical controller, to predetermined bits of a predetermined address of a RAM provided in second equipment, such as an electric power control circuit of a machine tool.

In general, a serial data transfer system is employed for data transfer between separated equipment with a view to reducing the number of transmission lines used. When the equipment on the receiving side processes received data by means of a microcomputer, it is necessary to convert the received serial data into parallel data and temporarily store it in a RAM or the like. In such an instance, it is customary in the prior art to perform the serial parallel conversion upon each reception of serial data of a predetermined number of bits, for example, eight bits, and store the converted data in the RAM. Accordingly, in the case where each bit of the serial data is given a specific significance, there will be caused, at the receiving side, a time lag in recognition corresponding to the time needed for sending the predetermined number of bits of serial data.

SUMMARY OF THE INVENTION

The present invention is intended to overcome such a defect of the prior art and has for its object to provide a data transfer system by which serial data sent from first equipment can be transferred, bit by bit, to predetermined bits of a predetermined address of a RAM in second equipment.

To attain the above objective, the present invention provides a data transfer system by which each bit of serial data sent from first equipment is transferred to a predetermined bit of a predetermined address of a RAM in second equipment upon each occurrence of a clock pulse from the first equipment, in synchronism with each data bit. The data transfer system comprises a counter which is incremented by the clock pulses, an address generator which responds to the output of the counter to create an address of the RAM, a bit address generator which responds to the output of the counter to create a bit address for specifying a bit position in one address of the RAM, a timing control circuit which responds to the output of the counter to generate timing signals for a read cycle and a subsequent cycle during the generation of one address by the address generator, and a read modify write circuit by which data at that bit position of a plurality of bits in parallel data corresponding to the address from the address generator, read out of the RAM in the read cycle specified by the timing control circuit, which is specified by the bit address from the bit address generator, is replaced with corresponding bit data of the serial data sent from the first equipment, and the replaced parallel data is transferred to the original address in the RAM during the write cycle specified by the timing control circuit.

BRIEF DESCRIPTION OF THE DRAWINGS

FIGS. 3 and 4 are charts for explaining operations of an address generator 210, a bit address generator 211 and a timing control circuit 209;

DESCRIPTION OF THE PREFERRED EMBODIMENT

Figure 1:
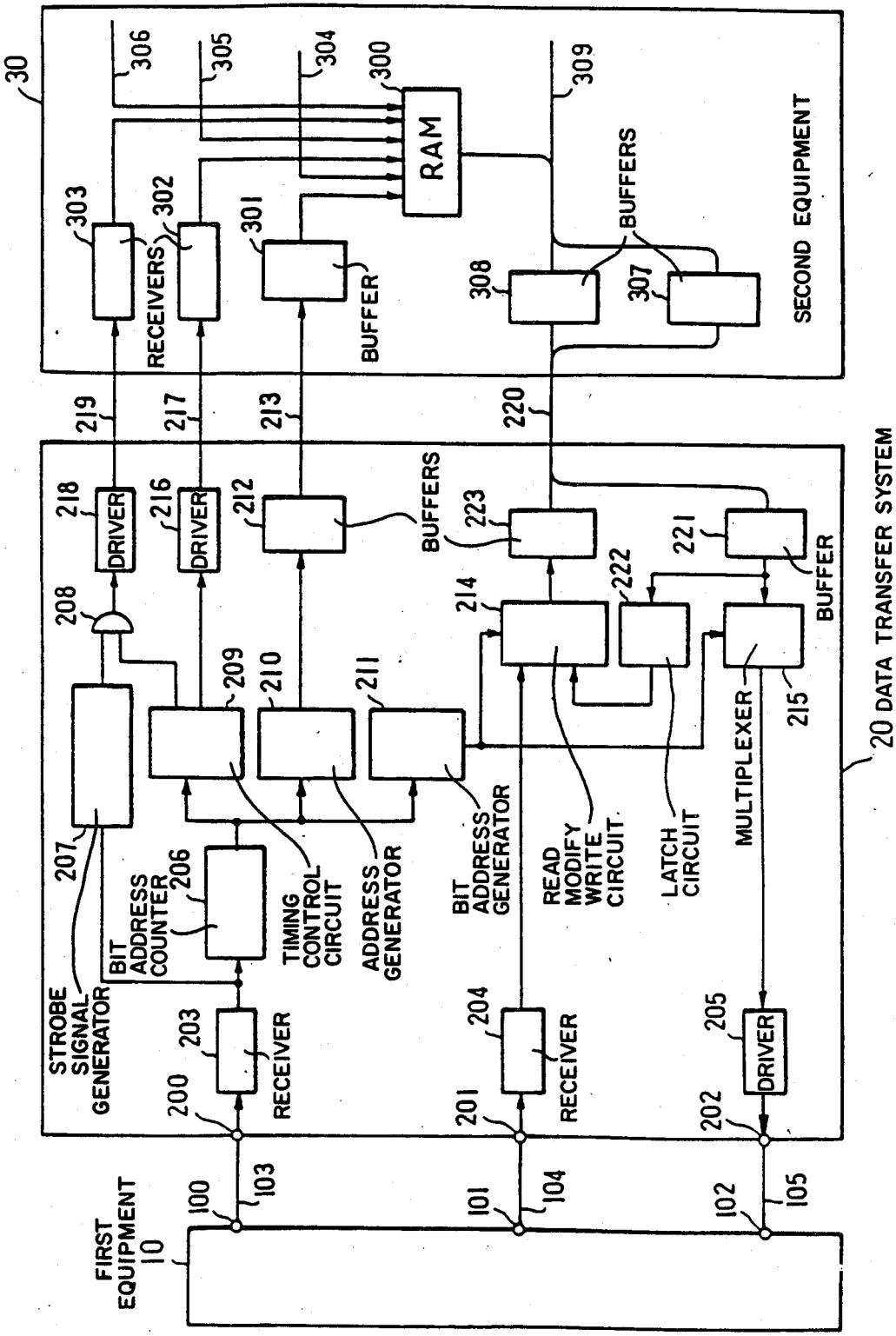
FIG. 1 is a block diagram of the principal part of an embodiment of the present invention.

FIG. 1 illustrates in block form the principal part of an embodiment of the present invention. Reference numeral 10 indicates first equipment such as a numerical controller, 20 a data transfer system embodying the present invention, 30 second equipment such as an electric control circuit of a machine tool. Let it be assumed, for convenience of description, that a total of 100 kinds of transmission information are transferred from the first equipment via the data transfer system 20 to a receiving are of a RAM 300 of the second equipment 30, and that a total of 100 kinds of reception information are transferred via the data transfer system 20 to the first equipment 10. The reception information and the transmission information are each ON-OFF control information represented by one bit.

Figure 2:
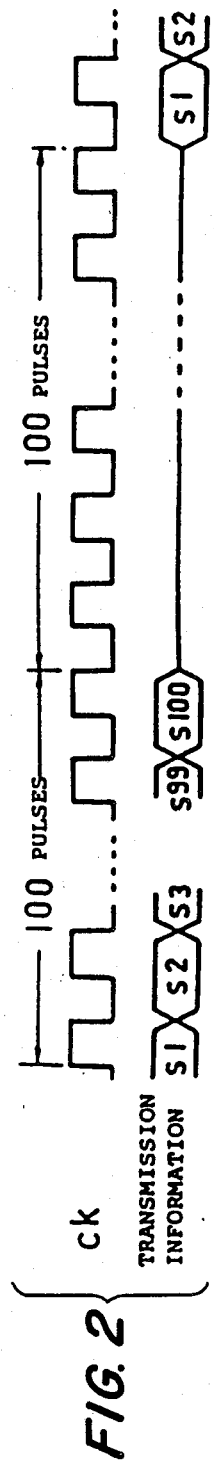
FIG. 2 is a diagram for explaining a serial timing clock and transmission information which are delivered from first equipment.

The first equipment 10 has a terminal 100 for delivering a serial timing clock, a terminal 101 for serially transferring the transmission information and a terminal 102 for receiving serial reception information. The first equipment 10 repeats an operation such, for example, as shown in the timing chart of FIG. 2, in units of bits of the transmission and the reception information. That is, after performing, for all transmission information s1 to s100, an operation of sending out one piece of transmission information from the terminal 101 upon each delivery of one clock pulse ck from the terminal 100 and in synchronism therewith, the first equipment delivers 100 clock pulses alone for reception information without sending out transmission information from the terminal 101 and thereafter again performs a serial transfer of transmission information synchronized with the clock pulse ck.

The data transfer system 20 has a clock input terminal 200, a data input terminal 201 and a data output terminal 202 which are connected to the first equipment 10 via transmission lines 103 to 105, respectively. The terminals 200 and 201 are connected to receivers 203 and 204, respectively, and the terminal 202 is connected to a driver 205. The output of the receiver 203 is connected to the inputs of a bit address counter 206 and a strobe signal generator 207. The bit address counter 206 is a counter which is incremented by the output of the receiver 203 and, when having counted all the bits (200 bits in this example) of the transmission and the reception information, is set to its initial value, resuming the counting operation. The strobe signal generator 207 responds to the output of the receiver 203 to generate two strobe signals in one cylce of the RAM 300, the strobe signals being provided to an AND circuit 208.

The output of the bit address counter 206 is applied to a timing control circuit 209, an address generator 210 and a bit address generator 211. The address generator 210 responds to the output of the counter 206 to generate an address of the RAM 300 and sends it to an address input terminal of the RAM 300 via a buffer 212, an address bus 213 and a buffer 301. The bit address generator 211 responds to the output of the counter 206 to generate a bit address for specifying a bit position in one address of the RAM 300 specified by the address generator 210. The bit address thus created is provided to a read modify write circuit 214 and an 8:1 multiplexer 215. The timing control circuit 209 responds to the output of the counter 206 to generate a timing signal for only a read cycle, or the read cycle and a subsequent write cycle, during the period of generation of one address by the address generator 210. A read/write control signal is applied to a read/write terminal of the RAM 300 via a driver 216, a read/write line 217 and a receiver 302. Furthermore, the timing control circuit 209 yields a control signal for enabling the AND circuit 208, through which the strobe signals are provided to a strobe terminal of the RAM 300 via a driver 218, a strobe line 219 and a receiver 303.

The RAM 300 is a dual port type RAM, which is accessed from the data transfer system 20 via the buffer 301, the receiver 302 and the driver 303 and from a microcomputer of an electric power control device (not shown), via an address but 304, a read/write line 305, a strobe line 306 and a data bus 309. ON-OFF information is transmitted and received between the numerical controller and the electric power control device of a machine tool via the RAM 300. Eight-bit data (transmission or reception information) read out of the RAM 300 is applied to the multiplexer 215 and a latch circuit 222 via a buffer 307, a data bus 220 and a buffer 221. The output of the latch circuit 222 is provided to the read modify write circuit 214. The read modify write circuit 214 substitutes bit data from the receiver 204 for data at that bit position of a plurality of bits in parallel data corresponding to an address from the address generator 210, read out of the RAM 300 in the read cycle specified by the timing control circuit 209, which is specified by a bit address from the bit address generator 211. The substituted parallel data is transferred to the original address in the RAM 300 via a buffer 223, the data bus 220 and a buffer 308 in the write cycle specified by the timing control circuit 209. The multiplexer 215 selects, from the 8-bit output of the buffer 221, a bit specified by the bit address generator 211, and provides it to the driver 205.

In the case of transferring the transmission information s1 to s100 to each bit position of addresses 0 to 12 (a transmitting area) of the RAM 300 and transferring, as serial reception information r1 to r100, reception information stored at each bit position of addresses 20 to 32 (a receiving area) of the RAM 300 to the first equipment 10 (as depicted in FIG. 3), the address generator 210, the bit address generator 211 and the timing control circuit 209 create such an address, a bit address and a read/write control signal as shown in FIG. 3, in accordance with the output of the bit address counter 206 corresponding to each transmission and reception information. Such an arrangement can easily be implemented by forming the address generator 210, the bit address generator 211 and the timing control circuit 209 of ROMs which are addressed by the output of the bit address counter 206 to output the address, the bit address and the read/write control signal, respectively.

Figure 4:
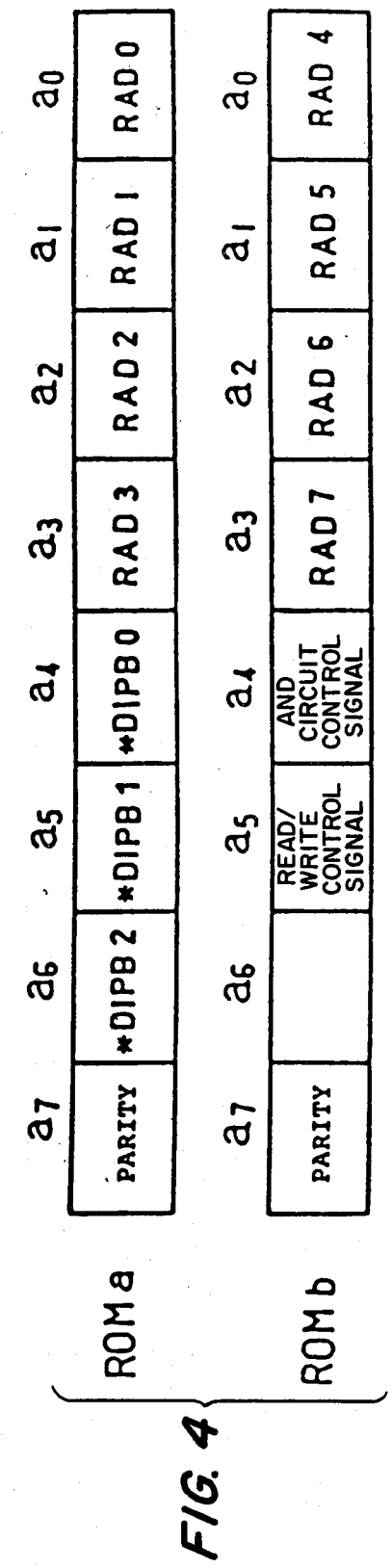

FIG. 4 shows an example of the setting of stored information in the case where the address generator 210, the bit address generator 211 and the timing control circuit 209 are implemented by two 8-bit ROMs indicated by ROMa and ROMb. Addresses RAD0 to RAD7 of the RAM 300 are stored in four low-order bits ($a_0$ to $a_3$) of the ROMa and ROMb and bit addresses *DIPB0 to *DIPB2 are stored in bits $a_4$ to $a_6$ of the ROMa. The control signal for the AND circuit 208 is stored in a bit $a_4$ of the ROMb and the read/write control signal is stored in its bit $a_5$. Additional circuitry is provided so that when the write control signal (for example, a "0") is being stored in the bit $a_5$, the read control signal is sent to the driver 216 in the first half of the period during which one address is being generated by the address generator 210, and the write control signal is sent in the latter half of that period. When the read control signal is being stored in the bit $a_5$, the read control signal is created during the period of generation of one address by the address generator 210. Incidentally, a bit $a_7$ of each of ROMa and ROMb is a parity bit.

Figure 5:
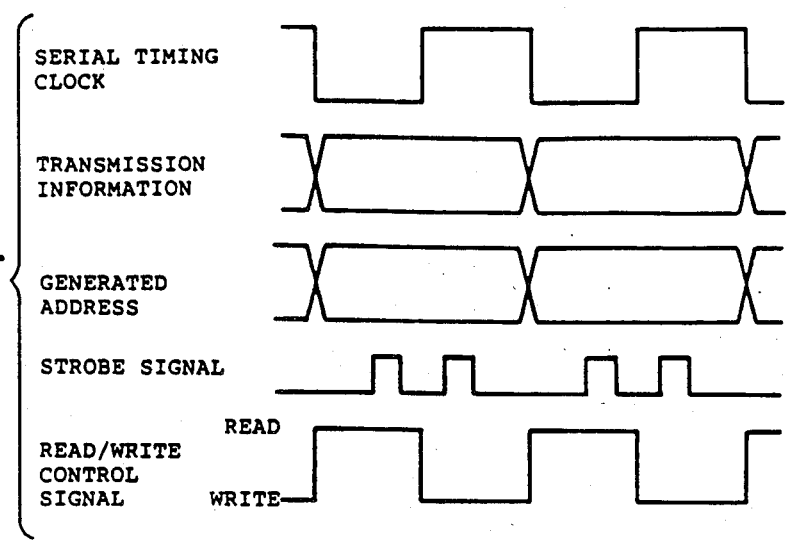
FIG. 5 is a timing chart for transferring serial transmission data from the first equipment to a RAM 300.

FIG. 5 is a timing chart for transferring serial transmission data from the first equipment to the RAM 300. Upon each occurrence of a serial timing clock pulse, a predetermined address is produced by the address generator 210 and 8-bit data corresponding to an address to be stored is read out of the RAM 300 by a strobe signal during generation of the read control signal from the timing control circuit 209. Further, data substituted with serial transmission data in the read modify write circuit 214 is transferred to the original address of the RAM 300 by the strobe signal during generation of the write control signal.

Figure 6:
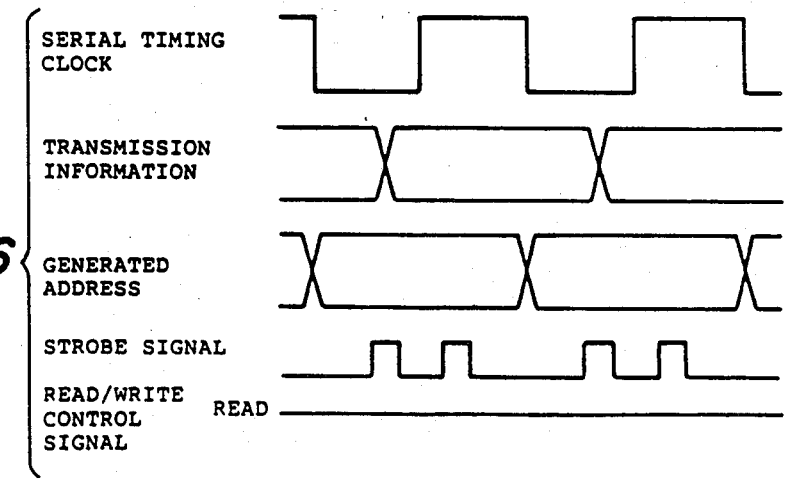
FIG. 6 is a timing chart for transferring reception information of the RAM 300 to the first equipment.

FIG. 6 is a timing chart for transferring reception information of the RAM 300 to the first equipment. Information on an address of the RAM 300, specified by the address generator 210, is read out by the strobe signal during generation of the read control signal from the timing control circuit 209 and a predetermined bit is selected in the multiplexer 215 and is then transferred to the first equipment 10.

Now, a description will be given of the operation of the system illustrated in FIG. 1.

(1) When 1-bit transmission information for a data transfer from the first equipment 10 to the second equipment 30 is sent out from the terminal 101 of the first equipment 10, an address of the RAM 300 at which the transmission information is to be stored, is created by the address generator 210 according to the contents of the bit address counter 206 specified by a serial timing clock which is synchronized with the above-mentioned 1-bit transmission information, and a bit address at which the transmission information is to be stored, is generated by the bit address generator 211. Moreover, a read control signal and a write control signal subsequent thereto are produced by the timing control circuit 209. By a first strobe signal from the strobe signal generator 207, store information for the address in the RAM 300 at which the above-mentioned transmission information is to be stored, is delivered to the latch circuit 222 and the multiplexer 215 via the buffer 307, the data bus 220 and the buffer 221.

The read modify write circuit 214 substitutes the transmissison information from the receiver 204 for that bit in the output of the latch circuit 222 which corresponds to the bit address. The thus replaced bit is sent to the RAM 300 via the buffer 223, the data bus 220 and the buffer 308. The data provided to the RAM 300 is set therein at the point in time when the write control signal from the timing control circuit 209 is applied to the RAM 300 and the strobe signal from the strobe signal generator 207 is applied to the RAM 300.

When the next transmission information is provided at the terminal 201, it is written in the next bit position of the RAM 300 since the bit address counter 206 is incremented by the serial timing clock pulse synchronized with the transmission information.

(2) Upon application of the next serial timing clock pulse to the bit address counter 206 after completion of the transfer of a predetermined number of transmission information for the data transfer from the second equipment 30 to the first equipment 10, the address generator 210 generates the leading address of the receiving area of the RAM 300, the bit address generator 211 the leading bit address and the timing control circuit 209 a read control signal. Accordingly, information at the leading address of the receiving area of the RAM 300 is introduced into the multiplexer 215 via the buffer 307, the data bus 220 and the bus 221 at the timing of generation of a strobe signal from the strobe signal generator 207, and 1-bit reception information corresponding to the bit address is selected by the multiplexer 215 and provided therefrom to the driver 205. Upon occurrence of the next serial timing clock pulse, the bit address counter 206 is incremented by one, so reception information at the bit next to the leading address of the RAM 300 is delivered via the driver 205 to the first equipment 10. Upon completion of the last reception information, the operations described above in (1) are carried out again.

The above embodiment has been described as having an arrangement in which transmission information is stored in the RAM 300 sequentially starting at its leading address and then reception information is read out sequentially from the receiving area. However, by modifying the outputs of the address generator 210, the bit address generator 211 and the timing control circuit 209 corresponding to the count value of the bit address counter by rewriting the ROM, it is possible to use desired address and bits as the transmitting area and the receiving area. Such an arrangement can easily be applied as well to the serial data transfer in which the RAM has a different information array.

While the data transfer system of the above embodiment has been described to perform the operation of transferring serial data from the first equipment to the RAM 300 on a bitwise basis and the operation of transferring data in the receiving area of the RAM 300 as serial data to the first equipment 10 also on the bitwise basis, the latter operation can be omitted as required.

As described above, the present invention is directed to a data transfer system through which each bit of serial data sent from first equipment is transferred to a predetermined bit of a predetermined address of a RAM in second equipment upon each occurrence of a clock pulse which is delivered from the first equipment in synchronism with each data bit. The data transfer system is provided with a counter which is incremented by the above-mentioned clock pulses, an address generator which responds to the output of the counter to create an address of the RAM, a bit address generator which responds to the output of the counter to generate a bit address for specifying a bit position in one address of the RAM, a timing control circuit which responds to the output of the counter to generate timing signals for a read cycle and the succeeding write cycle during the period of generation of one address by the address generator, and a read modify write circuit for substituting a bit of the serial data sent from the first equipment for data at that bit position of a plurality of bits in parallel data corresponding to the address from the address generator, read out of the RAM in the read cycle specified by the timing control circuit, which is specified by the bit address from the bit address generator. The parallel data thus replaced is transferred to the original address in the RAM during the write cycle specified by the timing control circuit. Thus, the serial data sent from the first equipment can be transferred to a predetermined bit of a predetermined address in the RAM of the second equipment on a bitwise basis. Accordingly, since the contents of the RAM are updated for each bit of the serial transmitted data, the second equipment which identifies the contents of the transmitted information by reading out the contents of the RAM can quickly identify the transmitted information. In particular, the use of a ROM for the address generator, the bit address generator and the timing control circuit permits simplification of the circuit arrangement and easy modification of an address and a bit of the RAM from which data is read and into which data is written.

What is claimed is:

1. A data transfer system through which each bit of serial data sent from first equipment is transferred to a predetermined bit of a predetermined address of a RAM in second equipment upon each occurrence of a plurality of clock pulses which are delivered from the first equipment in synchronism with each data bit, comprising:

a counter which is incremented by the clock pulses, said counter coupled to the first equipment;

an address generator, coupled to said counter, for responding to the output of said counter to generate an address of the RAM;

a bit address generator, coupled to said counter, for responding to the output of said counter to generate a bit address for specifying a bit position in one address of the RAM;

a timing control circuit, coupled to said counter, for responding to the output of said counter to generate timing signals for a read cycle and a write cycle succeeding the read cycle, during the period of generation of one address by said address generator; and a read modify write circuit, coupled to said bit address generator and the first equipment, for substituting a bit of the serial data sent from the first equipment for data at the bit position specified by said bit address generator from a plurality of bits of a parallel data corresponding to the address generated by said address generator, the parallel data being read out of the RAM in the read cycle specified by said timing control circuit, the parallel data having the substituted data bit being transferred to the address in the RAM generated by said address generator during the write cycle specified by said timing control circuit.

2. A data transfer system for transmitting data between first and second equipment, the first equipment sending serial data and clock pulses, the second equipment having a RAM for storing the serial data and synchronizing with the clock pulses delivered by the first equipment, the first equipment sending each data bit of the serial data in synchronism with the clock pulses, said data transfer system comprising:

a counter, coupled to the first equipment, for incrementing an address in accordance with the clock pulses delivered by the first equipment;

an address generator, coupled to said counter and to the RAM in the second equipment, for receiving the output of said counter and for generating a selected address for accessing the RAM;

a bit address generator, coupled to said counter, for receiving the output of said counter and for generating a bit address for specifying a bit position in the selected address of the RAM generated by said address generator;

a timing control circuit, coupled to said counter and to the RAM, for receiving the output of said counter and for generating timing signals for read and write cycles during the period of generation of the selected address by said address generator, so that parallel data corresponding to the selected address is read out of the RAM in the read cycle specified by said timing control circuit; and a read modify write circuit, coupled to the first equipment, the RAM and said bit address generator, for substituting the bit of the serial data sent from the first equipment for the data at the bit position specified by said bit address generator in the parallel data read out of the RAM, and for transferring the parallel data including the substituted data bit to the selected address in the RAM during the write cycle specified by said timing control circuit.

3. A data transfer system according to claim 2, wherein said address generator, said bit address generator and said timing control circuit are formed by ROMs.

* * * * *